Patented Jan. 30, 1951

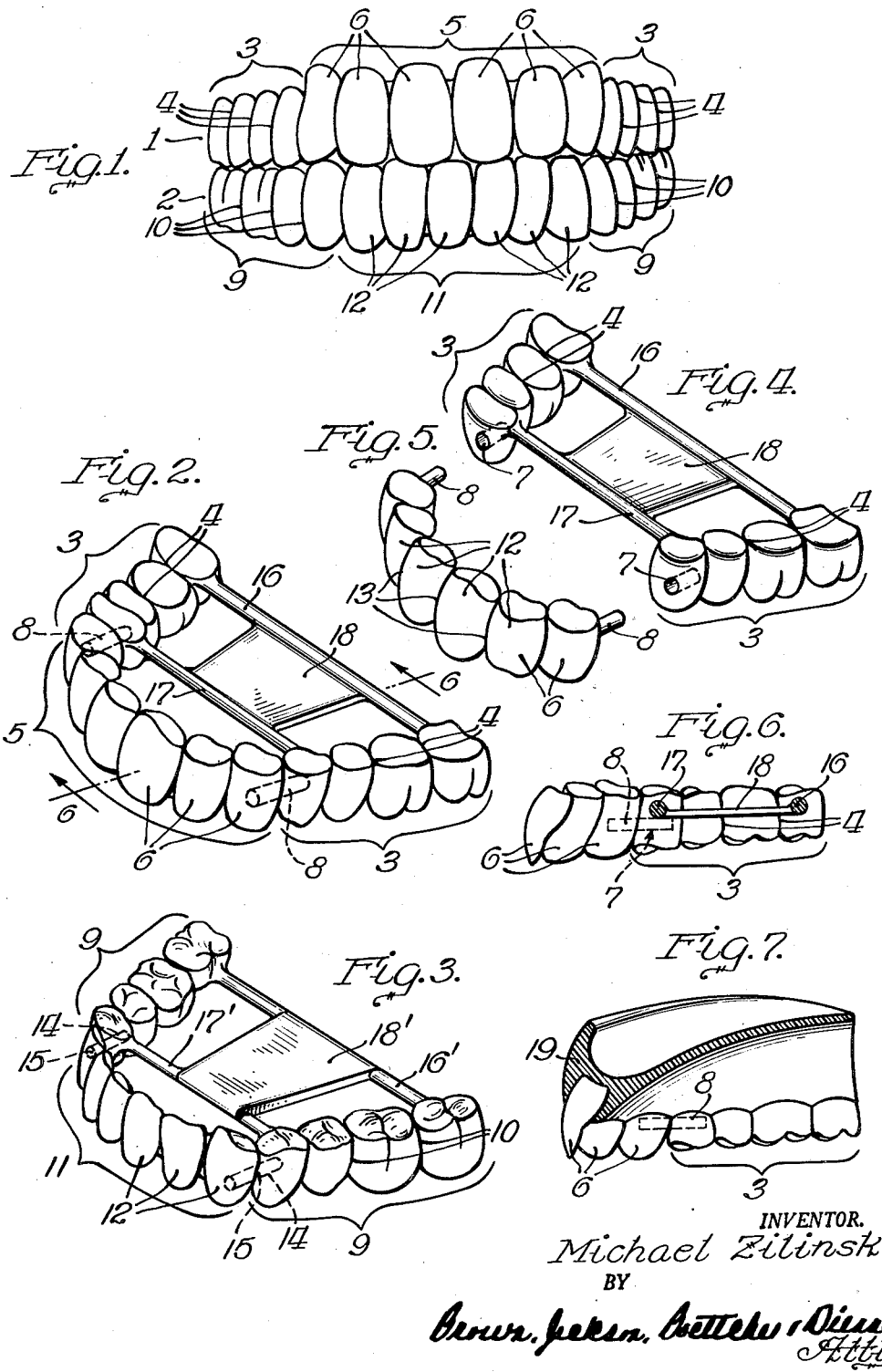

2,539,883

UNITED STATES PATENT OFFICE 2,539,883

ARTIFICIAL TEETH

Michael Zilinski, New Rochelle, N. Y.

Application August 28, 1948, Serial No. 46,671

6 Claims. (Cl. 32—2)

This invention relates, in general, to artificial teeth, and may be characterized as an improvement in the preformed anatomical and mechanical maxilla and mandible tooth arches disclosed and claimed in my copending application Serial No. 793,677, filed December 24, 1947.

According to my above mentioned copending application, the preformed anatomical and mechanical maxilla and mandible tooth arches each comprises a full set of artificial teeth for the adjacent jaws. The teeth of each arch are in occlusion to each other (i. e., positioned in proper relation to the ridges which accommodate the respective arches, as well as in proper relation to the teeth in the opposing arch), and are rigidly joined into rigid unitary arches with the gingival ends of the teeth of each arch exposed and adapted to be joined as a unit to a denture base.

My prior invention simplifies tooth arrangement constantly and uniformly to obtain the most desirable functional relationship of the upper and lower arches to one another, because each arch is rigid and composed of fourteen teeth, and the teeth—especially the posterior teeth—being preset in correct anatomical and functional relationship, the necessity of skill on the technician's part in setting the fourteen teeth of each arch is avoided.

However, my prior invention does not lend itself to possible changes that may be required, particularly on the anterior teeth. Moreover, my prior invention does not lend itself as well as might be desired to producing the posterior teeth in sections of porcelain or other suitable material to provide better wearing surfaces for the posterior teeth, with the anterior teeth formed of plastic material—such as a synthetic resin—or other material different from the posterior tooth material, for example, to improve the bond between them and the denture base, lighten the weight of the anterior teeth, eliminate the click in masticating or talking, and simplify the production of the anterior teeth.

One of the main objects of the present invention is to provide preformed anatomical and mechanical maxilla and mandible tooth arches of construction which will lend themselves to production of posterior teeth in predetermined occlusal relation; also to possible changes that may be required, particularly on the anterior teeth, and to production by highly skilled dental technicians of anterior sections of highest quality esthetics.

Another object of the invention is to provide preformed anatomical and mechanical maxilla and mandible tooth arches of construction which will lend themselves to production of the posterior teeth in sections of porcelain or other suitable material to provide better wearing surfaces for the posterior teeth, with the anterior teeth formed of plastic material such as synthetic resin or other material different from the posterior tooth material, for example, to improve the bond between them and the denture base, lighten the weight of the anterior teeth, eliminate the click in masticating or talking, and simplify the production of the anterior teeth.

Another and more general object of the invention is to provide preformed anatomical and mechanical maxilla and mandible tooth arches having posterior teeth, bicuspid and molars, in occlusion, formed of porcelain or other suitable material to provide better wearing surfaces for the posterior teeth, and anterior teeth formed of plastic material such as synthetic resin or other material different from the posterior tooth material.

Another object of the invention is to provide preformed anatomical and mechanical maxilla and mandible tooth arches each comprising a full set of rigidly joined posterior teeth at each side, the posterior teeth for both arches being in occlusion to each other, with separate anterior partial arches having full sets of anterior teeth, and means at contiguous ends of the anterior and posterior arches for securing the anterior arches to the posterior arches in correct anatomical and functional relationship.

Further objects and advantages of the invention will appear from the following detailed description, taken in connection with the accompanying drawing in which:

Figure 1 is a front elevational view of upper and lower tooth arches embodying the present invention, showing the same properly articulated;

Figure 2 is a perspective view of the upper tooth arch shown in Figure 1;

Figure 3 is a perspective view of the lower tooth arch shown in Figure 1;

Figure 4 is a perspective view of the upper partial arch portion formed by the posterior teeth;

Figure 5 is a perspective view of the separate upper partial arch portion formed by the anterior teeth;

Figure 6 is a fragmentary detail section taken on the line 6—6 of Figure 2; and

Figure 7 is a fragmentary vertical section through the front of the upper tooth arch, showing the same applied to a denture base.

Referring now to the drawing, Figure 1 shows at 1 an upper or maxilla preformed anatomical and mechanical tooth arch embodying the present invention, and, at 2, a lower or mandible preformed anatomical and mechanical tooth arch embodying the invention properly articulated with respect to the arch 1.

The upper tooth arch 1 comprises a full set of eight posterior teeth 3, bicuspid and molars—four at each side—preformed in proper anatomical and mechanical relation and rigidly joined at 4 into an upper rigid unitary partial tooth arch.

The upper tooth arch 1 also includes a separate anterior arch 5 having six anterior teeth 6 rigidly joined together into an upper rigid unitary anterior tooth arch. The contiguous ends of the posterior and anterior partial arches have means for securing the anterior arches to the posterior arches in correct anatomical and functional relationship. The anterior teeth 6 may thus be made up in various molds, sizes, and styles, and will fit into a certain series of arches. This will enable a dentist or laboratory to try various types of anterior teeth with various occluded posterior partial tooth arches, and to fasten the selected anterior tooth arch to the partial posterior tooth arch with which it is to be used.

The means at contiguous ends of the posterior and anterior partial arches for securing the anterior arches to the partial posterior arches in correct anatomical and functional relationship may vary widely within the scope of the present invention. As illustrative of one suitable means, the first bicuspid teeth are shown having recesses 7 which receive and fit projections 8 extending from various anterior sets of six teeth each. Various anterior sets of teeth may be tried by inserting the projections 8 thereof into the recesses 7 and positioning the anterior sets of teeth in correct anatomical and functional relationship with respect to the posterior teeth. When the anterior tooth arch, which it is desired to use, is selected, the projections 8 are cemented or otherwise secured in place in the recesses 7.

The pins 8 may be cemented or otherwise secured in the ends of the anterior arch part, preferably in parallel relation as shown, or they may be formed integral with the ends of the anterior arch part or otherwise applied thereto. It is to be understood that the recesses may be in the ends of the anterior arch part and the pins on the posterior arch part, and that other forms of means for joining the arch parts may be employed within the scope of the present invention.

The lower tooth arch 2 similarly comprises a full set of eight posterior teeth 9, bicuspid and molars, four at each side, preformed in proper anatomical and mechanical relation and rigidly joined at 10 into a lower rigid unitary partial tooth arch. Both the upper and lower arches—and particularly the posterior teeth thereof—are in occlusion to each other.

The lower tooth arch 2 also includes a separate anterior tooth arch 11 having six anterior teeth 12 rigidly joined together at 13 into a lower rigid unitary anterior tooth arch. The contiguous ends of the posterior and anterior lower partial arches have means for securing the anterior arches to the posterior arches in correct anatomical and functional relationship. As in the case of the upper anterior teeth 6, the lower anterior teeth 12 may be made up in various molds, sizes and styles, and will fit into a certain series of arches. This will enable a dentist or laboratory to try various types of lower anterior teeth with various occluded posterior lower partial tooth arches and to fasten the selected anterior tooth arch to the partial posterior tooth arch with which it is to be used.

As described in connection with the upper tooth arch, the means at contiguous ends of the lower posterior and anterior partial arches for securing the lower anterior arches to the lower partial posterior arches in correct anatomical and functional relationship may vary widely within the scope of the present invention. As illustrative of one suitable means, the first bicuspid teeth of the lower partial arch are shown having recesses 14 which fit projections 15 extending from various anterior sets of six teeth each. As with the upper arch, various anterior sets of lower teeth can be tried by inserting the projections 15 thereof into the recesses 14 and positioning the lower anterior sets of teeth in correct anatomical and functional relationship with respect to the lower posterior teeth. When the lower anterior tooth arch which it is desired to use is selected, the projections 15 are cemented or otherwise secured in place in the recesses 14.

In making the upper and lower partial posterior tooth arches of the present invention, master patterns are made corresponding with the tooth arches which it is desired to form. The manipulative details of obtaining the desired anatomical and mechanical relationship of the tooth portions of the master pattern, and occlusion of the arches to each other, are well known to those skilled in the art and will not be described, the present invention not being concerned specifically therewith. The master patterns may be formed of artificial stone, metal, or any other suitable or preferred pattern material.

Upon completion of the master patterns, they are used, for example, to form molds having cavities in which the preformed anatomical and mechanical partial posterior tooth arches are formed. Suitable methods for forming molds having such cavities are also well known to those skilled in the art, and they will not be described in detail, the present invention not being concerned specifically therewith.

The separate anterior tooth arches may also be made by first making master patterns corresponding with the anterior arches which it is desired to form, and using these patterns to form molds having cavities in which the preformed anatomical and mechanical anterior arches are formed, as described in connection with the formation of the posterior tooth arches. The anterior arches may be made in various molds, sizes and styles, to fit into a certain series of posterior arches for the purposes previously described. It is to be understood, of course, that the upper and lower anterior arches may also be in occlusion to each other if desired.

Where the preformed anatomical and mechanical anterior arches are formed of resinous material, this material may be introduced into the mold cavities and molded and cured to the form of the desired anterior arch comprising six anterior teeth for an adjacent jaw and in which all of the anterior teeth of the arch are rigidly joined together into a rigid unitary structure by the tooth material.

Where the preformed anatomical and mechanical posterior arches are formed of resinous material, they may be formed, for example, in the manner described in connection with the formation of the anterior arches. I contemplate, however, within the scope of the present invention forming the posterior teeth of the posterior arches in porcelain sections in order to provide better wearing surfaces for the posterior teeth, yet retaining the advantages of the arches themselves. These posterior partial arches may then be adapted, by recesses, pins, or the like, to be attached to the six anterior plastic or resinous teeth. This provides better wearing surfaces for the posterior teeth, and with the anterior teeth formed of plastic or resinous material— such as synthetic resin or other material different from the posterior tooth material—improves the bond between the anterior teeth and the denture base, lightens the weight of the anterior teeth, eliminates the click in masticating or talking, and simplifies the production of the anterior teeth.

The manufacturer, in providing these preformed anatomical and mechanical tooth arches, will provide the preformed posterior arches in a plurality of different shapes and a plurality of different sizes for each shape; also, if desired, covering the several typal forms of teeth and different shades. He will also provide the anterior arches in various molds, sizes, and styles to fit into a certain series of posterior arches. With these available from the manufacturer, or, for example, from the dental laboratory or distributor, it becomes only necessary for the dentist or technician to order the arches, for example, by size, mold number, and shade number of the teeth. Where a dental laboratory or distributor is at hand, the dentist may take his model to such laboratory or distributor and immediately select the posterior tooth arches desired and the anterior tooth arches which he prefers to use therewith.

The making up of the preformed anatomical and mechanical posterior arches of different sizes and different contours provides for adaptation to most mouth contours and sizes, and, with the teeth of the arch rigidly joined into a rigid unitary structure, distortion of the arch from the original typal form given it in its manufacture is avoided in transportation and handling the arches. This is important because it assures maintenance at all times of the proper preformed anatomical and mechanical relation of the teeth. Moreover, in applying the tooth arches to the denture bases, there is no bending of the tooth set-ups to fit them to the desired configuration which would distort the original preformed anatomical and mechanical set-up given to the teeth in making the arch.

The same features and advantages are also present in the rigid anterior tooth arches.

The present invention simplifies tooth arrangement constantly and uniformly to obtain the most desirable functioning relationship of the upper and lower arches to one another because the arches are rigid, and the teeth—especially the posterior teeth—being set in correct anatomical and functional relationship, the necessity for skill on the technician's part is eliminated. Heretofore it has been necessary for the technicians to set the fourteen teeth in each arch individually, which requires considerable skill and considerable expenditure of time and not always results in the best possible end result from the standpoint of function.

In the illustrated embodiment of the invention, lateral bracing means is provided between the sides of the partial posterior arches for maintaining the desired rigidity of the arches and the desired relation of the teeth after the arch is completed. The bracing means for the upper posterior partial arch, as shown in Figures 2 and 4, is in the form of a generally H-shaped truss or brace having its leg 16 extending laterally between the rearwardmost posterior teeth 3 and its other leg 17 extending laterally between the forwardmost posterior or bicuspid teeth. The ends of the legs 16 and 17 of the bracing structure are formed integral with the teeth at opposite sides of the arch, and the connecting piece 18 between the intermediate portions of the legs 16 and 17 is formed integral with said legs 16 and 17.

The bracing structure may be molded as an integral part of the partial posterior arch in the formation thereof. The connecting piece 18 of the bracing structure is shown of flat form and is adapted to carry, for example, the mold number and shade number or other data identifying the size and shape of the arch, and, if desired, the color and form of the teeth as well as the name of the product and the manufacturer.

The bracing structure for the lower partial posterior arch is similar to the bracing structure for the upper arch, and the parts thereof are designated in Figure 3 by primed reference characters corresponding with the reference characters used in Figures 2 and 4 for designating the parts of the bracing structure for the upper partial posterior arch.

Where the bracing structure described is employed, it may be removed from the arch, for example, by cutting the ends of the laterally extending legs of the brace or truss from the adjacent teeth at the time the denture base is molded or joined to the gingival ends of the teeth to form the plate or denture with the set up teeth and the base formed to fit the patient's mouth. While in place, the brace not only maintains the desired rigidity of the posterior partial arch and the desired relation of the teeth and prevents breakage, particularly in transporting and handling the arches, but it also prevents warpage during storage, especially where the rigidly joined teeth are made of synthetic resin material.

In using the preformed arches in making a denture, the set up may be obtained by first adapting a hard base plate—such as shellac or other suitable material—to the model which has been obtained in the usual manner from the impression from the patient's mouth. Next, wax is applied over the ridge area of the adapted base plate against which will be secured the preformed arch comprising the posterior partial arch, with the anterior arch secured thereto by means of hot wax. The set up may then be pressed in the patient's mouth for a try-in to check the aesthetic as well as the occlusal relationships, the wax permitting some adjustment. After the desired aesthetic and occlusal relationships are secured, the trial plates are referred back to the models, and after securing them to the models and completing the waxing operation they are processed in the usual manner—that is, by investing the model with the waxed up and preformed arches applied thereto. The wax is then eliminated, for example, by boiling out in the usual way, and the resin material for the denture base is introduced into the cavity and molded to the preformed arch. In forming the base of the denture shown at 19 in Figure 7, the teeth (where they are formed of resin material) may be softened along the gingival ends, but on account of the preformed and rigid relationship of the arch there is no distortion of the arch in the application of the base to it, the investing material preventing any possibility of distortion.

The preformed arches, and particularly the preformed partial posterior arches, are made to dimensions arrived at, for example, by measuring a model taken from an impression of the jaw so that the arch can be selected which will fit directly over the ridge of the lower model. The upper model and arch are placed in articulation with the opposing lower preformed arch. These arches, when attached to bases molded to fit models made from impressions taken by dentists of edentulous patient's upper and lower jaws, enable a dentist or dental laboratory technician to create comfortable, natural appearing restorations for the purpose of replacing natural teeth which have been lost.

The arches, and particularly the partial posterior arches, are arranged anatomically and mechanically so that the cusps balance throughout both sets during lateral and protrusive movement. This is obtained by the antero-posterior curve of the occlusal surfaces known as the compensating curve. This makes possible greater stability.

The teeth on the arches are preferably narrow buccolingually so as to apply less load to the underlying tissues, and consequently eliminate excessive resorption. They are also preferably made with full length lingual surfaces, thereby eliminating excessive thickness of completed dentures on palatal and lingual areas, allowing for greater tongue room, natural environment, and no speech interference.

The arches have a tooth arrangement with better aesthetics than most dental laboratory technicians can obtain by setting up individual teeth. This is because the original set ups may be made by highly skilled techinicians, and the rigidity of the arches maintains the tooth arrangement at all times. The arches may have a tooth arrangement enabling the dental laboratory technician to set up the teeth to an equal height on each side and with both sides parallel to a line through the centers of the pupils of the eyes. They can be set into position faster and better than 28 individual teeth, and they can be set up on either plane line or adjustable articulators.

Moreover, the arches of the present invention provide and preserve a maximum of masticating efficiency because there is no occasion to grind or mutilate cusps on the arches under any circumstances. The arches provide greater security for the teeth after processing and eliminate the danger of movement of individual teeth during processing. They make it possible to supply anatomical articulation on all dentures constructed with the arches. The articulation may be worked out to perfection in the master patterns by technicians of outstanding ability, and the dentures with the use of the arches can be made without requiring that the technicians performing that work have as great ability. It is possible to effect a saving in skilled techincians' labor as compared to the time required for setting up and articulating individual teeth.

In addition, there is a definate time and labor saving to the dentists in that the arches have a tendency to eliminate spot grinding to the occlusion of the mouth. The arches may be tried in the patient's mouth for checking aesthetics, harmony of tooth form, size of teeth, and arrangement, and they need not be supplied in as many shades as are required for individual teeth used on dentures.

The embodiment of the invention shown in the drawing is for illustrative purposes only, and it is to be expressly understood that said drawing and the accompanying specification are not to be construed as a definition of the limits or scope of the invention, reference being had to the appended claims for that purpose.

I claim:

1. Ready-made maxilla and mandible tooth arches each comprising a set of posterior teeth at each side, the posterior teeth of each set being in occlusion to each other and permanently and rigidly joined together along contiguous mesial and distal sides of the teeth by the tooth material, a separate anterior partial tooth arch having a set of anterior teeth, the anterior teeth of said anterior partial tooth arch being directly and rigidly joined together along contiguous mesial and distal sides of the teeth by the tooth material, the lingual surfaces of said posterior and anterior teeth following the anatomy of natural teeth throughout substantially their entire extent, and means formed directly on mesial and distal sides of the tooth bodies of contiguous posterior and anterior teeth for securing said anterior tooth arch to said posterior tooth arches in correct anatomical and functional relationship and against relative up and down movement.

2. Ready-made maxilla and mandible tooth arches according to claim 1 wherein the means for securing the anterior tooth arch to the posterior tooth arches comprises a recess formed directly in the tooth body of one of each pair of contiguous posterior and anterior teeth and a projection formed directly on the tooth body of the other of each pair of contiguous posterior and anterior teeth and adapted to be fixedly secured in said recesses.

3. Ready-made maxilla and mandible tooth arches according to claim 1 wherein the posterior teeth are formed of porcelain-like material and the anterior teeth are formed of resinous material whereby to provide better wearing surfaces for the posterior teeth and less click and weight along the anterior teeth combined with improved bond along the anterior teeth when the arches are applied to denture bases formed of resinous material.

4. As a new article of manufacture, a preformed anatomical and mechanical tooth arch structure comprising at least two sets of posterior teeth one for each side of the arch structure, each set of posterior teeth comprising a plurality of posterior teeth permanently and rigidly joined together by the tooth material, means formed directly on the mesial side of the forwardmost tooth of each set of posterior teeth for securing an anterior tooth arch to the forward ends of said sets of posterior teeth and against up and down movement relative thereto, and bracing means extending laterally between the sets of posterior teeth, with the opposite ends of said bracing means joined directly and integrally to the lingual surfaces of the posterior teeth of the respective sets of posterior teeth.

5. A preformed anatomical and mechanical tooth arch structure according to claim 4 wherein the sets of posterior teeth and the bracing means are molded integrally together and of the same material.

6. A preformed anatomical and mechanical tooth arch structure according to claim 4 wherein the bracing means is of generally H-shaped configuration.

MICHAEL ZILINSKI.

REFERENCES CITED

The following references are of record in the file of this patent:

UNITED STATES PATENTS

| Number | Name | Date |
|---|---|---|
| 1,461,305 | Brookes et al. | July 10, 1923 |
| 1,692,928 | Clapp et al. | Nov. 27, 1928 |
| 1,814,717 | Maizner | July 14, 1931 |
| 1,924,265 | Wharton | Aug. 29, 1933 |
| 2,457,529 | Busby | Dec. 28, 1948 |